Patented June 1, 1954

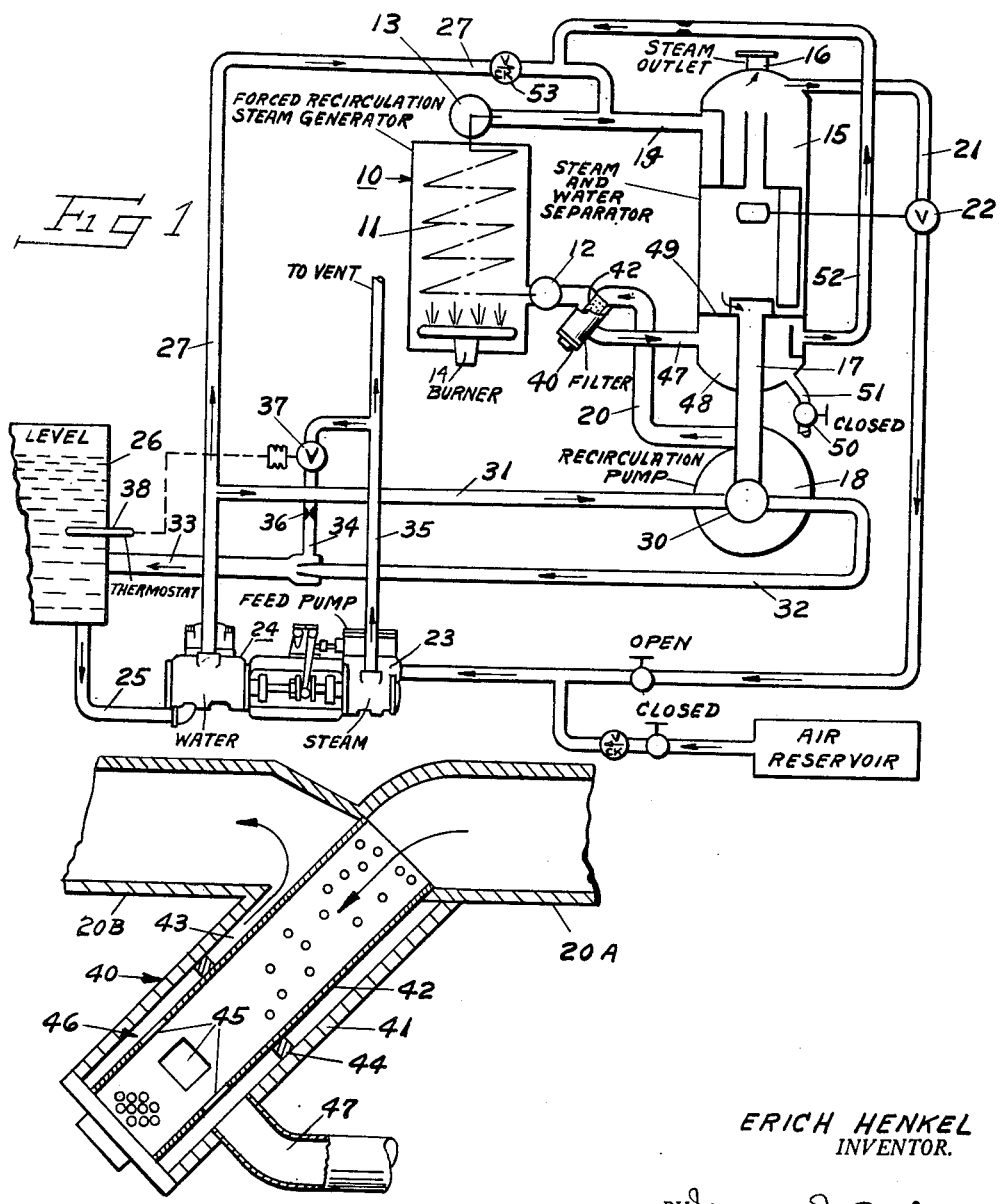

2,679,831

UNITED STATES PATENT OFFICE 2,679,831

WATER SUPPLY SYSTEM FOR FORCED RECIRCULATION STEAM GENERATORS

Erich W. Henkel, Calumet City, Ill., assignor to Combustion Engineering, Inc., New York, N. Y.

Application October 27, 1949, Serial No. 123,860

6 Claims. (Cl. 122—386)

1

The present invention relates to steam generators and particularly to improvements in the system for the supply and circulation of water in a generator of the controlled circulation type.

In controlled circulation boilers the quantity of water exposed to heat at any instant is relatively small. The mixture of the water and steam passes into a separator from which steam is withdrawn for use while the water is recirculated through the tubes by the recirculation pump. Feed water to replace the steam used is supplied by a feed water pump and for economy of operation it is desirable to reclaim the heat of at least part of the exhaust steam from this pump as well as water, such as feed water, circulated through the gland of the recirculation pump to maintain it cool. The fact that the make-up water is required in only relatively small amounts leads to the use of reciprocating pumps for supplying the feed water. This, however, results in pulsations in the supply of water which it is desirable to avoid. Other novel features and advantages of the present system for supplying feed water and recirculating it through the generator tubes will become apparent upon consideration of the following detailed description of an illustrative embodiment thereof when read in conjunction with the accompanying drawings in which:

Figure 1 is a diagrammatic view showing a controlled recirculation steam generator and the water supply and recirculation means therefor embodying the present invention.

Figure 2 is an enlarged view of part of Figure 1 showing a self-cleaning strainer in the discharge line from the recirculation pump.

A controlled recirculation steam generator shown diagrammatically in Figure 1 is designated as a whole by the figure 10. Primarily it consists of a number of tubular coils 11 that are connected in parallel between supply and collecting headers 12 and 13 and absorb heat either by radiation or convection from gases produced by the supply of fuel to a burner 14. The mixture of steam and water from the tubes 11 is collected in the header 13 and conducted through pipe 19 to the steam and water separating drum 15. Steam for use, as in car heating on trains, is taken off at the outlet 16 while the separated water passes through a down-comer 17 to the inlet side of the recirculation pump 18 from which it is discharged to the supply header 12 through a pipe 20.

Steam taken from the drum 15 through the pipe 21 subject to the float controlled valve 22 is

2 admitted to the steam cylinder 23 of the feed water pump 24 whose suction side is connected by the pipe 25 to the water storage 26. Feed water to replace that taken from the generator in the form of steam in heating cars etc. is introduced by means of the pipe 27 into the pipe 19 between the collecting header 13 and the separating drum 15.

The feed water is treated chemically before entering the system to prevent scale formation on the evaporating surface. It is known that the scale preventive properties in chemically treated feed water are greatly improved if the treated water is heated to saturation temperature long before it comes in contact with the evaporating surface. Moreover, there are additional advantages in heating the feedwater. While the temperature of the feedwater is increasing, oxygen will be liberated. Thereafter, this total mixture (hot water at saturation temperature plus steam plus free oxygen plus the additional gases: nitrogen, etc.) enters the steam separator where steam and oxygen etc. are separated from the hot water. The steam and oxygen etc. escape from the steam separator while the hot water enters the hot water circulating pump from where it is forced through the evaporating surface. Thus, by introducing the feed water at this point it is preheated and the chemical reactions due to water conditioning are accelerated while the dissolved gases are released upon meeting the hot mixture of steam and water from collecting header 13. The free gases pass off through the outlet connection 16 with the steam, consequently these gases do not become re-dissolved in the water of separator 15 as is the case with many boiler installations.

The above conditions would be decidedly different if most or all of the water were fed into the system at some point downstream from the steam separator. In such case, the hot water would be chilled appreciably below saturation temperature, and consequently steaming delayed. The state of water would not be changed until several feet of evaporating tube surfaces have been traversed downstream from the orifices at the tube inlets. Therefore, on a weight basis, relatively more water would be contained in the evaporative tubes for any given load. The introduction of the feed water downstream from the steam separator would thus create an undesirable water storage in the tubular evaporating surface. Its magnitude cannot be controlled. When dealing with a controlled forced recirculation steam generator, water must be stored where its volume is under control at all times. The logical space to store it is in the unfired pressure vessel which in the present case is called the "steam separator." If some of the water is stored, "unintentionally," so to speak, in the tubular evaporating surface, control over the quantity which can be stored at any given moment is lost. When operating the steam generator at any given load, the temperature of the hot water entering the tubular evaporating surface determines the quantity of water which can be stored therein. The water regulator located in the steam separator (which is, as said before, the ideal storage space for the water) has no control over the temperature of the hot water. The water regulator causes the feed pump to run faster when the water level drops and it retards the pump speed when the water level rises. The introduction of the feed water (that is, most of it), in the pipe connecting outlet header with the separator eliminates boiler hunting, for reasons as described. Therefore, it is desirable that this method be used.

To cool the gland 30 of the recirculation pump a small amount of the feed water is circulated through the gland through the piping 31, 32. The pipe 31 receives feed water from the discharge line 27 of the feed water pump while the pipe 32 leads into an eductor generally designated by the numeral 33 which receives restricted amounts of the steam discharged from the steam cylinder 23 of the feed pump 24 through the line 35 by means of the pipe 34. The steam eductor discharges into the feed water supply tank 26 and the amount of steam condensed thereby may be regulated by a restriction 36 or a thermostatically controlled valve 37 regulated by a thermostatic element 38 subject to the temperature of the feed water in the supply tank 26.

Interposed in the pipe line 20 between the discharge of the recirculation pump 18 and the water supply header 12 of the steam generator 10 is a self-cleaning strainer designated as a whole by the numeral 40. As shown in Figure 2 the self-cleaning strainer 40 comprises a casing 41 forming a chamber containing a cylindrical screen 42 directly communicating at one end with the pipe 20A leading from the discharge side of the recirculation pump 18 so that the water from the latter flows into the interior of the perforated screen 42. Water passing through the perforations of the screen 42 and depositing any impurities on the walls thereof enters the chamber 43 to be discharged through the pipe 20B leading directly to the water supply header 12 of the steam generator. An annular member 44 surrounding the strainer screen 42 near its lower end and interposed between the screen and the inner wall of the chamber 43 limits the flow of water to the chamber 43 to the upper part of the screen while permitting a part of the water to flow through enlarged perforations or slots 45 in the screen 42 into another chamber 46 below the annular partition 44. Of course instead of extending screen 42 to the bottom of chamber 46 the screen might terminate intermediate the partition 44 and the bottom of the chamber so that the bottom end of the interior of the screen opens into chamber 46 making perforations 45 unnecessary. This limited amount of water passes from the strainer to a pipe 47 into a sediment chamber or mud drum 48 formed in the lower part of the separator drum 15 by the transverse partition 49. With this arrangement, whenever a valve 50 in a drain line 51 connecting with chamber 48 is opened part of the recirculated water is diverted to clean the inner walls of the cylindrical screen 42 and passes out through the larger openings 45 in the part thereof located into the chamber 46. However, continuous cleansing of the strainer screen 42 by part of the recirculated water is provided for by discharging water from the sediment chamber 48 through a pipe 52 that leads to the pipe 27 through which the feed pump 24 supplies make-up water to the generator via the check valve 53. Thus, cool feed water from the pump 24 admitted to the generator through the pipe 27 with pulsating flow is supplemented by a small quantity of hot water at or near saturation temperature from the separating drum 15 continuously supplied through the pipe 52 by the recirculation pump 18 via the pipes 47, 52. Consequently, the pulsations which would ordinarily cause the boiler pressure to fluctuate are compensated for by the recirculated water which tends to stabilize or reduce the boiler pulsations by preheating the feed water before it enters the generator through the separating drum 15.

What I claim is:

1. In a controlled recirculation steam generator having a steam and water separating drum, steam generating tubes connected between a supply header and a collecting header which discharges a mixture of steam and water at saturated steam temperature into said drum, a recirculation pump connected to withdraw separated water from said drum and introduce it into said supply header; the combination of a conduit connecting said collecting header and said separating drum above the water level in the latter for discharging the mixture of steam and water into said drum; a supply of relatively cool feed water; a feed water pump; and piping directly connecting the discharge of said feed pump to said conduit adjacent said drum for mixing the fresh feed water with the saturated steam and water mixture from said tubes.

2. In a controlled recirculation steam generator having a steam and water separating drum, steam generating tubes connected between a supply header and a collecting header which discharges a mixture of steam and water into said drum, a recirculation pump connected to withdraw the heated, separated water from said drum and introduce it into said supply header; the combination of; a conduit connecting said collecting header and said separating drum above the water level therein for discharging the mixture of steam and water into said drum; a supply of relatively cool feed water; a feed water pump; feed water piping connecting the discharge of said feed pump to said conduit adjacent said drum; a check valve in said piping; and piping receiving water recirculated by said recirculation pump connected with said feed water piping downstream of said check valve therein for mixing heated water taken from said drum and recirculated by said recirculation pump with make-up water supplied by said reciprocating pump.

3. In a controlled recirculation steam generator having a steam and water separating drum, steam generating tubes connected between a supply header and a collecting header which discharges a mixture of steam and water into said drum, a centrifugal recirculation pump connected to withdraw separated water from said drum and supply it to the inlet ends of said tubes, a tank containing a supply of relatively cool water for said generator, a feed pump for withdrawing water from said tank, a steam engine for driving said feed pump and a gland cooling jacket on said recirculation pump; the combination of; piping connected with the discharge side of said feed water pump for diverting part of the cool feed water through said jacket, said piping extending beyond the outlet of said jacket to said tank; an eductor interposed in the piping between the gland cooling jacket of said recirculation pump and said water tank; and piping connecting the steam discharge of the engine for said feed water pump to said eductor for preheating the water returned from said jacket to said tank.

4. In a controlled recirculating steam generator having a steam and water separating drum, steam generating tubes connected between a supply header and a collecting header which discharges a mixture of steam and water into said drum, a centrifugal recirculation pump connected to withdraw separated water from said drum and supply it to the inlet ends of said tubes, a tank containing a supply of relatively cool water for said generator, a feed pump for withdrawing water from said tank, a steam engine for driving said pump, and a gland cooling jacket on said recirculation pump; the combination of; piping connected with the discharge of said feed water pump for diverting part of the cool feed water through said jacket, said piping extending beyond the outlet of said jacket back to said tank; an eductor interposed in the piping between the gland cooling jacket of said recirculation pump and said water tank; piping connecting the steam discharge of the engine for said feed water pump to said eductor for preheating the water returned from said jacket to said tank; a regulating valve in said last mentioned piping; and means responsive to the water temperature in said tank for controlling said valve.

5. In a controlled recirculation steam generator having a separating drum having a fluid-tight partition extending transversely across the lower part of said drum and forming a sediment chamber at its lower end separated from the water space, steam generating tubes connected between a supply header and a collecting header which discharges a mixture of steam and water into said drum, a recirculation pump connected to withdraw separated water from said drum, and a conduit connected with the discharge of said recirculation pump and connected to said supply header; the combination of a chamber interposed in said conduit containing a perforated sediment straining screen disposed in the path of fluid passing through said chamber; a blowdown connection leading from the sediment chamber; and a pipe operatively connecting the interior of said strainer chamber on the sediment straining side of said screen to the sediment chamber, through which piping part of the water delivered by said recirculation pump passes to carry sediment strained by said screen away through said blowdown connection.

6. In a controlled recirculation steam generator having a steam and water separator including a drum, steam generating tubes connected between a supply header and a collecting header which discharges a mixture of steam and water into said drum, and a recirculation pump for withdrawing separated water from said drum; the combination of a fluid tight partition extending transversely across the lower part of said drum and forming a sediment chamber at its lower end separated from the water space; a pipe connecting the water space of said drum above said partition to the inlet of said recirculation pump; a conduit connecting the discharge of said recirculation pump with said supply header; a strainer chamber in said conduit containing a perforated sediment straining screen; a blowdown connection heading from the lower part of said sediment chamber; and a pipe operatively connecting the interior of said chamber on its sediment straining surface to said sediment chamber, through which pipe part of the water delivered by said recirculation pump passes to continuously carry off sediment strained by said screen through said blowdown connection.

References Cited in the file of this patent

UNITED STATES PATENTS

| Number | Name | Date |
|---|---|---|
| 934,314 | Jones | Sept. 14, 1909 |
| 1,612,854 | Broido | Jan. 4, 1927 |
| 1,652,106 | Everett | Dec. 6, 1927 |
| 1,823,154 | Maier | Sept. 15, 1931 |
| 1,860,363 | La Mont | May 31, 1932 |
| 1,898,196 | Lucke | Feb. 21, 1933 |
| 1,935,635 | Jacobus | Nov. 21, 1933 |
| 2,032,368 | Kerr | Mar. 3, 1936 |
| 2,170,345 | Bailey et al. | Aug. 22, 1939 |
| 2,175,013 | Blizard | Oct. 3, 1939 |
| 2,199,214 | Vorkauf | Apr. 30, 1940 |
| 2,257,011 | Hillier | Sept. 23, 1941 |
| 2,412,043 | Griffin et al. | Dec. 3, 1946 |
| 2,463,814 | Skinner | Mar. 8, 1949 |
| 2,495,525 | Karassik | Jan. 24, 1950 |

FOREIGN PATENTS

| Number | Country | Date |
|---|---|---|
| 446,166 | Germany | June 24, 1927 |